(12) United States Patent
Murakawa et al.

(10) Patent No.: US 6,870,958 B2
(45) Date of Patent: Mar. 22, 2005

(54) IMAGE PROCESSOR FOR DETECTING SPECIFIED PATTERN

(75) Inventors: Akira Murakawa, Toyonaka (JP); Hirotomo Ishii, Toyonaka (JP); Chiho Kawakami, Tondabayashi (JP)

(73) Assignee: Minolta Co., Ltd., Osaka (JP)

( * ) Notice: Subject to any disclaimer, the term of this patent is extended or adjusted under 35 U.S.C. 154(b) by 552 days.

(21) Appl. No.: 09/848,214

(22) Filed: May 4, 2001

(65) Prior Publication Data

US 2001/0053250 A1 Dec. 20, 2001

(30) Foreign Application Priority Data

May 12, 2000 (JP) ........................................ 2000-140343

(51) Int. Cl.$^7$ ................................................ G06K 9/66
(52) U.S. Cl. ..................................... 382/195; 382/194
(58) Field of Search ............................... 382/135, 151, 382/165, 181, 190, 192, 195, 194, 197, 203, 209, 224, 225, 288, 291, 305

(56) References Cited

U.S. PATENT DOCUMENTS

| | | | | |
|---|---|---|---|---|
| 3,887,762 A | * | 6/1975 | Uno et al. | 348/126 |
| 4,021,778 A | * | 5/1977 | Ueda et al. | 382/203 |
| 5,390,003 A | | 2/1995 | Yamaguchi et al. | 399/366 |
| 5,515,451 A | | 5/1996 | Tsuji et al. | 382/135 |
| 6,289,125 B1 | * | 9/2001 | Katoh et al. | 382/194 |
| 6,307,963 B1 | * | 10/2001 | Nishida et al. | 382/190 |

FOREIGN PATENT DOCUMENTS

JP          11-053539          2/1999

* cited by examiner

*Primary Examiner*—Daniel Mariam
(74) *Attorney, Agent, or Firm*—Burns, Doane, Swecker & Mathis, L.L.P.

(57) ABSTRACT

An image processor detects a specified pattern defined by arrangement of three or more elements. Positions of a plurality of element candidates are detected based on input image data, and n pairs (n≧2) of element candidates are selected in the plurality of elements. Then, n arrangement criterions are determined based on the positions of the selected n pairs, and one arrangement criterion is determined based on the n arrangement criterions. By using the one arrangement criterion, positions of all the elements are calculated in the specified pattern. The specified pattern is detected based on the calculated positions of the arrangement.

18 Claims, 7 Drawing Sheets

IMAGE PROCESSOR FOR DETECTING SPECIFIED PATTERN

This application is based on applications No. 2000-140343 filed in Japan, the contents of which are hereby incorporated by reference.

BACKGROUND OF THE INVENTION

1. Field of the Invention

The present invention relates to image processing for detecting a specified pattern in an image.

2. Description of the Prior Art

Recently, a color copying machine provides many functions with improved performance, and counterfeit on paper money, securities or the like becomes a big problem. Then, effective countermeasures for preventing counterfeit have been developed. In one of the countermeasures, a specified pattern is embedded in a design of a paper money or the like. When an image scanned is read in copying operation in a copying machine, the scanned image is analyzed. If the specified pattern is detected in the image, normal image forming is forbidden so as not to copy the image.

When a paper money or the like is scanned, the specified pattern has to be detected from the scanned image even when the paper money or the like is put in an arbitrary position on a scanner or even when it has stains, damages or the like locally.

Most of the input data received from an input device such as a scanner are color image having many data. Further, there is a tendency that the input and output devices can deal an image at higher speed and at higher resolution. However, image processing or detection of the specified patterns is required to be performed real time in order to prevent counterfeit. Then, it is an important problem to develop a technique of image detection at high speed even in the presence of noises.

A pattern having three or more elements arranged at predetermined positions is used as one of the specified patterns for preventing counterfeit. Previously, when such a specified pattern is detected, a reference bit pattern on the arrangement of the elements is stored for comparison with an image to be checked. In order to deal with rotation of the image, a plurality of reference bit patterns displaced by a certain angle successively are prepared further. First, elements are detected in input image data. Next, the arrangement of the detected elements is compared on all the reference bit patterns. The largest degree of matching obtained by the comparison is adopted as the degree of matching.

However, this recognition technique has following problems. A large amount of reference bit patterns have to be prepared according to a plurality of rotation angles. Further, comparison is performed for the plurality of angles, efficiency of image recognition is not good. Further, the precision of image recognition becomes worse when the image is expanded or reduced.

SUMMARY OF THE INVENTION

An object of the present invention is to perform image processing for detecting a specified pattern at higher precision efficiently.

An image processor according to the invention detects a specified pattern defined by arrangement of three or more elements. A first detector detects positions of a plurality of element candidates based on input image data, and a selector selects n pairs ($n \geq 2$) of element candidates in the plurality of element candidates. A determinater unit determines n arrangement criterions based on the positions of the selected n pairs and determines one arrangement criterion based on the n arrangement criterions. Then, by using the one arrangement criterion, a calculater unit calculates positions of all the element candidates in the specified pattern. A second detector detects the specified pattern based on the calculated positions of the arrangement.

An advantage of the present invention is that a specified pattern can be detected efficiently.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
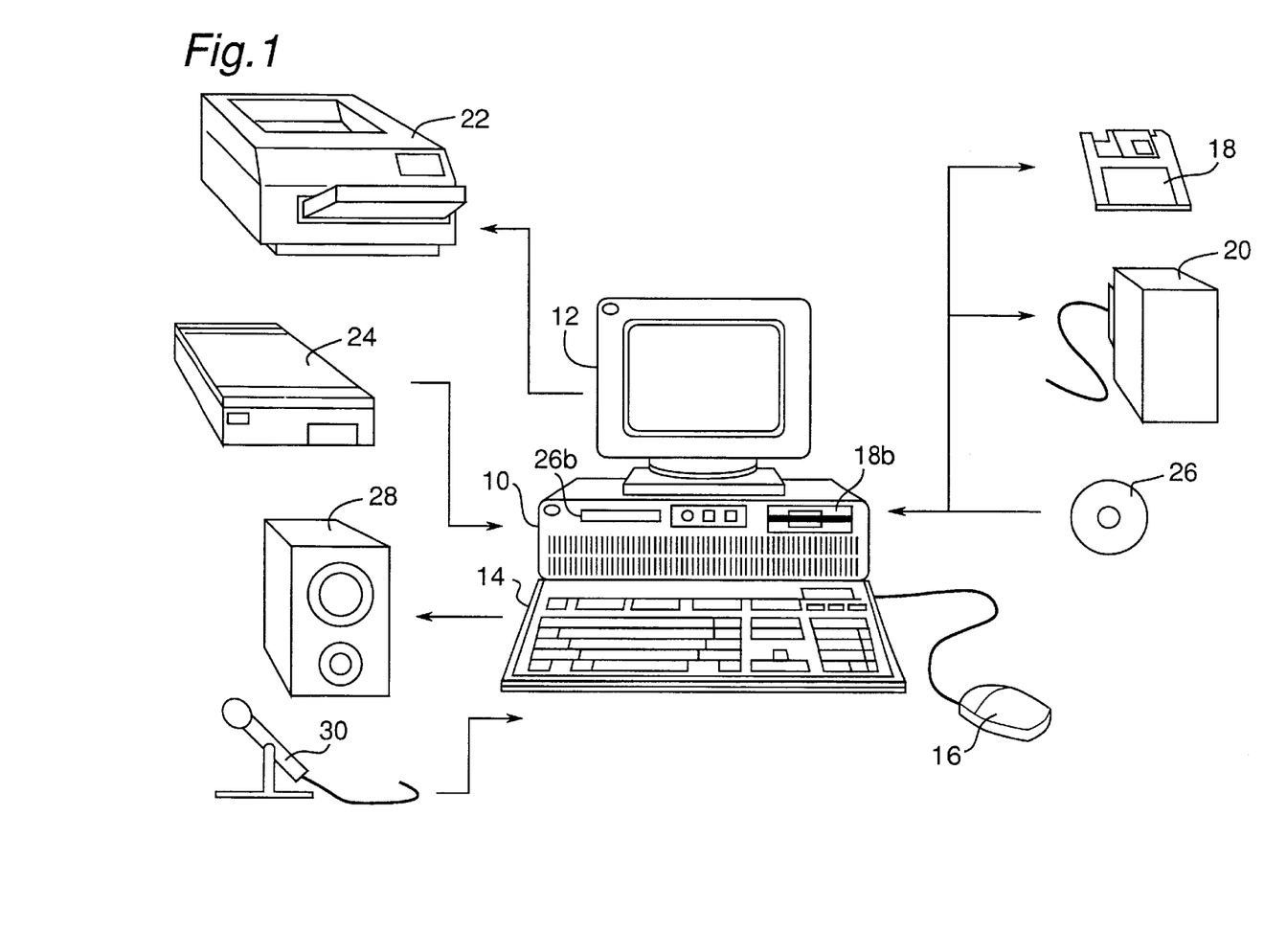
FIG. 1 is a diagram of an image processor according to a first embodiment of the invention.

Referring now to the drawings, wherein like reference characters designate like or corresponding parts throughout the several views, FIG. 1 shows an image processor according to an embodiment of the invention schematically. The image processor has a controller 10 which has a central processing unit (hereinafter referred to as CPU) to control the entire system. The controller 10 has a display device 12 for displaying images, characters or the like, and a keyboard 14 and a mouse 16 provided for inputting data and instructions. A flexible disk 18, a hard disk 20 and a CD-ROM 26 are used as recording media, and a flexible disk drive 18b, a CD-ROM drive 26b and a hard disk drive (not shown) are provided therefor. Further, the controller 10 is connected to a printer 22 for printing text data, an image or the like, a scanner 24 for acquiring image data, a speaker 28 for generating sound, and a microphone 30 for receiving sound.

Figure 2:
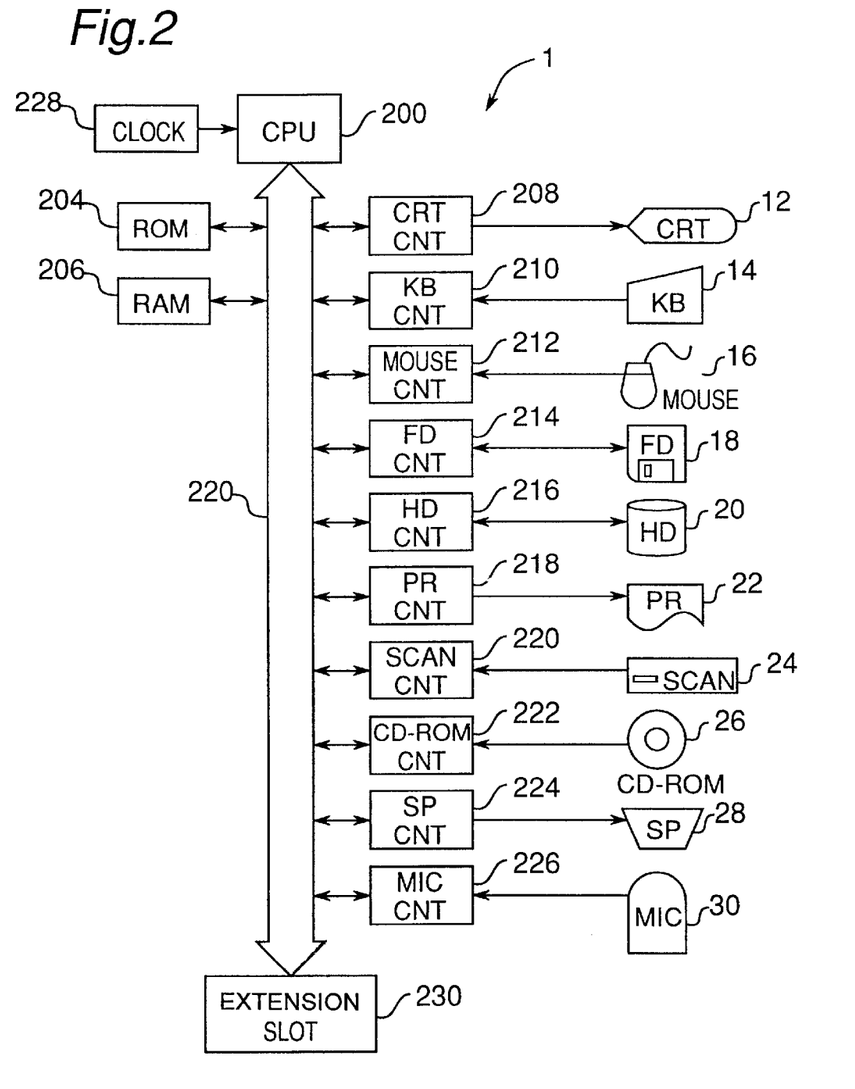
FIG. 2 is a schematic block diagram of a part of the image processor including a controller thereof.

FIG. 2 shows a structure of the controller 10. The CPU 200 is connected via a data bus 202 to a read only memory (ROM) 204 for storing a program to control the system or the like, and to a random access memory 206 for storing the program or the like temporarily used by the CPU 200. Further, CPU 200 is connected via the data bus 202 to a display controller 208 for displaying images or characters in the display device 12, to a keyboard controller 210 for transmitting key-inputs from the keyboard 14, to a mouse controller 212 for transmitting input signal from the mouse 16, to a flexible disk drive controller 214 for accessing the flexible disk drive 18b, to a hard disk drive controller 216 for accessing the hard disk drive, to a printer controller 218 for controlling the printer 22, to a scanner controller 220 for controlling the scanner 24, to a CD-ROM controller 222 for controlling the CD-ROM drive 26b, to a speaker controller 224 for controlling the speaker 28 and to a microphone controller 226 for controlling the microphone 30. Further, the CPU 200 is connected to a clock circuit 228 for generating reference clock signals for operating the system, and it has an extension slot 230 for connecting an extension board.

In the image processor, a program for image processing is stored in a recording medium such as ROM 204. However, the program or a part thereof may be stored in a recording medium such as the flexible disk 18, the hard disk or the CD-ROM 26. When necessary, it is read therefrom and written to the RAM 206. A magneto-optical disk or the like may also be used as a storage medium. The scanner 24 is used as a device for inputting image data, but a different data input device such as a still video camera or a digital camera may also be used. Further, by connecting a network board to the extension slot 230, a program or an image data may be received through a network.

Figure 3:
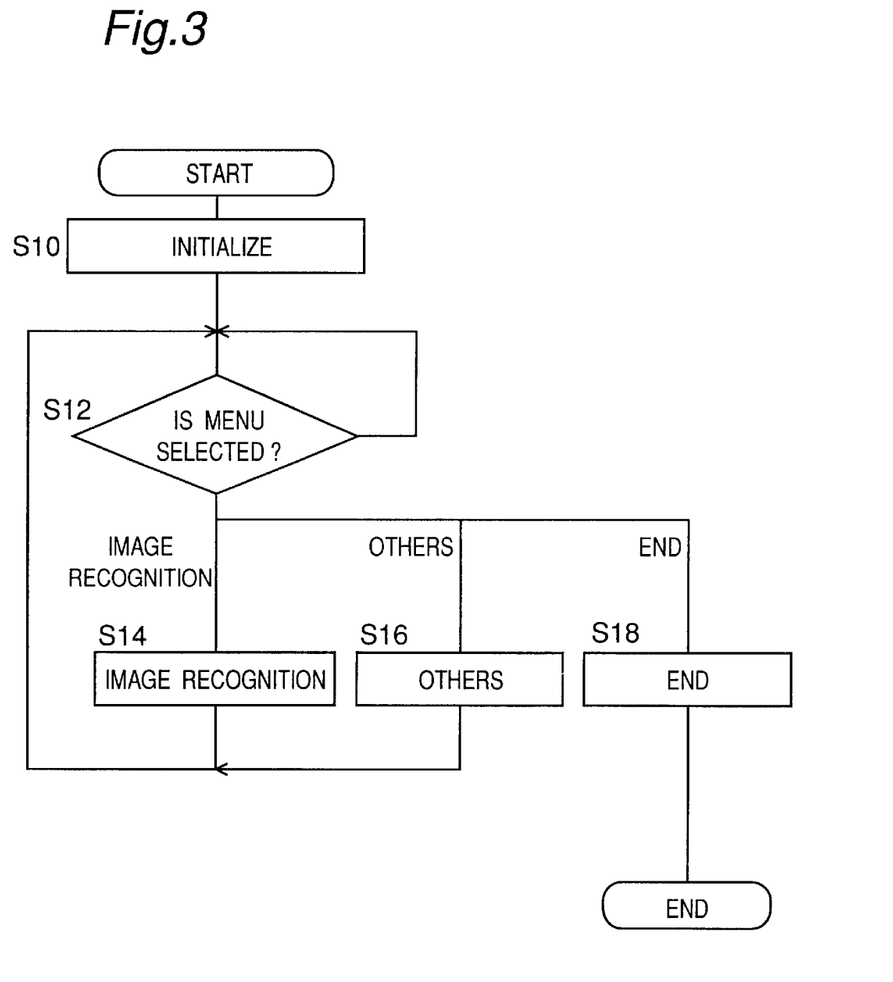
FIG. 3 is a flowchart of a main routine of the image processor.

FIG. 3 shows a flow of data processing executed by the CPU 202 in the above-mentioned image processor. When the image processor is started, initialization is performed first (S10). For example, flags necessary for the following processing are initialized, and an initial screen is displayed. Next, it is waited that a user selects a menu (S12). When the selection is performed, any one of the processings of image recognition of specified arrangement pattern (S14), one of the other menu items (S16), and end (S18) according to the user's selection. The other menu items are not relevant to the invention, and they are not explained further. The image recognition (S14) will be explained later in detail. In this embodiment, a specified pattern consisting of five elements (refer to FIG. 5) is detected reliably in the image recognition (S14), as will be explained in detail later. An element represents a partial image included in the specified pattern, and the specified pattern consists of a plurality of the elements.

Figure 4:
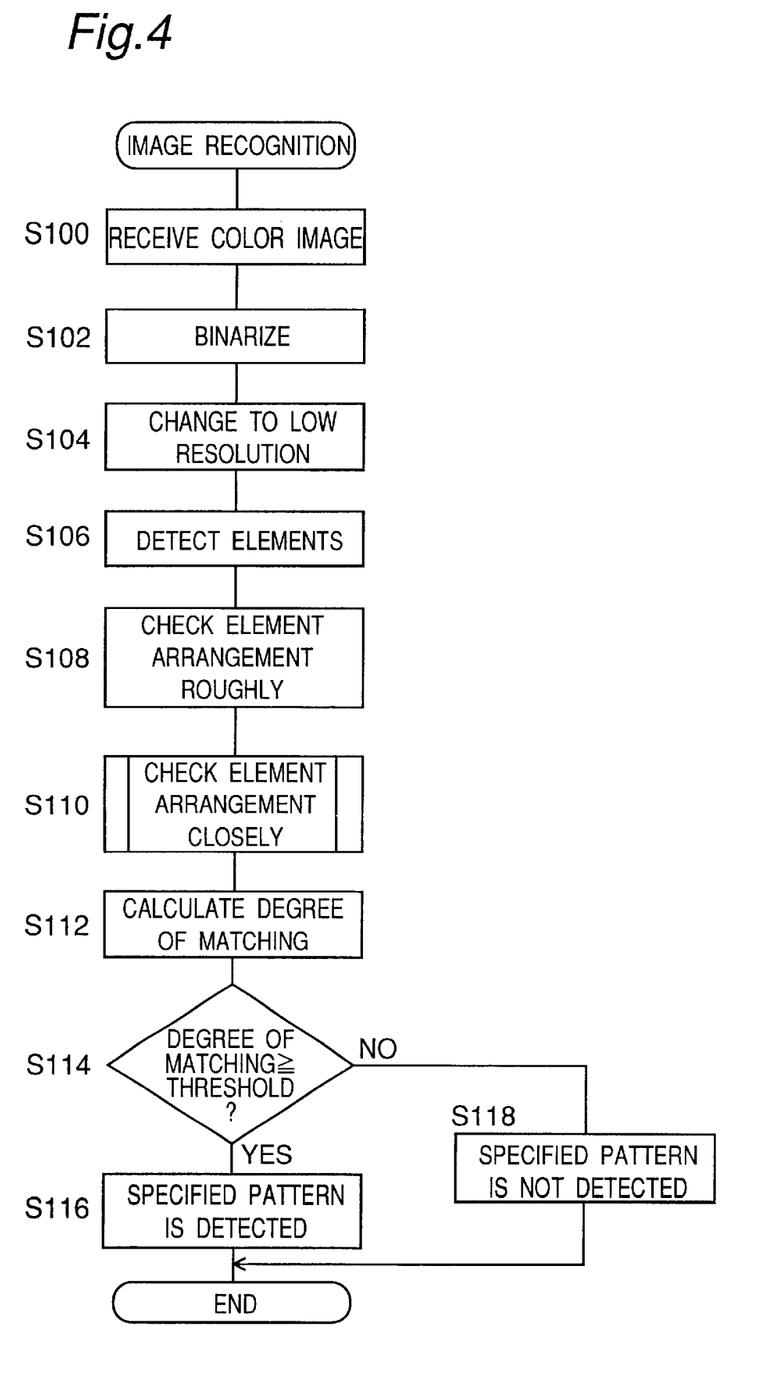
FIG. 4 is a flowchart of recognition of a specified pattern.

FIG. 4 shows a general flow of the image recognition (S14 in FIG. 3). First, color image data as an object of the image recognition are received (S100). Next, the input color image data are binarized with respect to a specified color to provide bi-level image data (S102). In the binarization, if red (R), green (G) and blue (B) values of each pixel in the image is decided to exist in predetermined ranges, a bit for the pixel is set to "on", otherwise it is set to "off". For example, when the following conditions are satisfied, the bit for the pixel is set to "on".

$$RedMin \leq R \leq RedMax,$$

$$GreenMin \leq G \leq GreenMax, \quad (1)$$

and $$BlueMin \leq B \leq BlueMax,$$

wherein R, G and B represent red, green and blue values of the pixel, RedMax and RedMin represent a maximum and a minimum of the pixel value of red, GreenMax and GreenMin represent a maximum and a minimum of the pixel value of green, BlueMax and BlieMin represent a maximum and a minimum of the pixel value of blue. The maxima and minima are determined beforehand according to the specified color to be detected. Next, in order to perform the image processing fast, the resolution (exactness of image) of the bi-level image data to be recognized is decreased to a value smaller than the original resolution, but capable of the image processing (S104).

Figure 5:
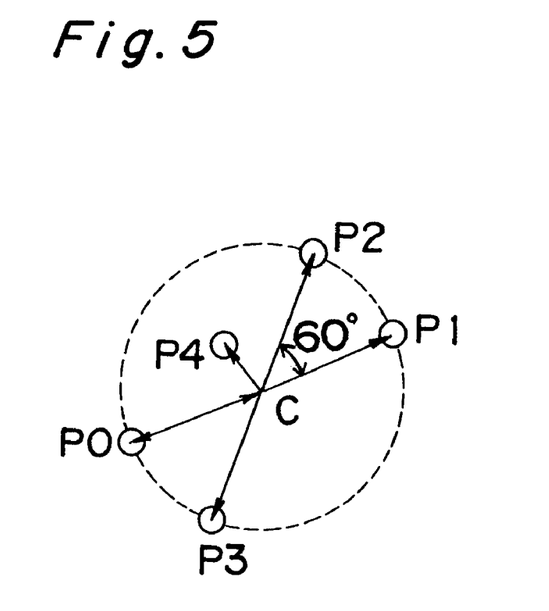
FIG. 5 is a diagram of an example of element arrangement.

Next, candidates of elements or forms of predetermined sizes are detected from the bi-level image data (S106). An element candidate is detected, for example, by scanning the bi-level image data with a filter and by performing pattern matching of the detected element image. Next, rough check of element candidates is performed according to the specifications on the arrangement of the elements (S108). In the rough check, the bi-level image data are matched with pixel data on the reference pattern stored in a memory for specifying the specified pattern. The specified pattern is defined by arrangement of three or more elements. In an example dealt in this embodiment, as shown in FIG. 5, the specified pattern consists of five elements P0 to P4. In the matching, a set of five element candidates all existing in five predetermined areas defined in the specified pattern are searched, and rough detection of the arrangement of the element candidates is performed. A plurality of reference patterns are prepared by taking rotation of the specified pattern (elements) into account.

Next, a set or sets of the element candidates detected above in the rough check of element candidates are checked further closely (S110). A set of the five element candidates has been decided that they exist in the five predetermined areas. In an example of the element arrangement explained here, as shown in FIG. 5, among the five elements P0 to P4, the elements P0 to P3 are arranged along a circumferential line. The elements P0 and P1 are located at two ends of the diameter of the circle, while the elements P2 and P3 are also located at two ends of the diameter. An angle between line segments P0P1 and P2P3 is 60°.

Next, the degree of matching is calculated based on the positions calculated at step S110 and the actual positions of the element candidates (S112). The final degree of matching is determined as an average of the degrees of matching of the five element candidates. If the obtained degree of matching is equal to or larger than a predetermined threshold value (YES at step S114), it is decided that the specified pattern is detected (S116). On the other hand, if the obtained degree of matching is smaller than the predetermined threshold value (NO at step S114), it is decided that the specified pattern is not detected (S118).

Figure 6:
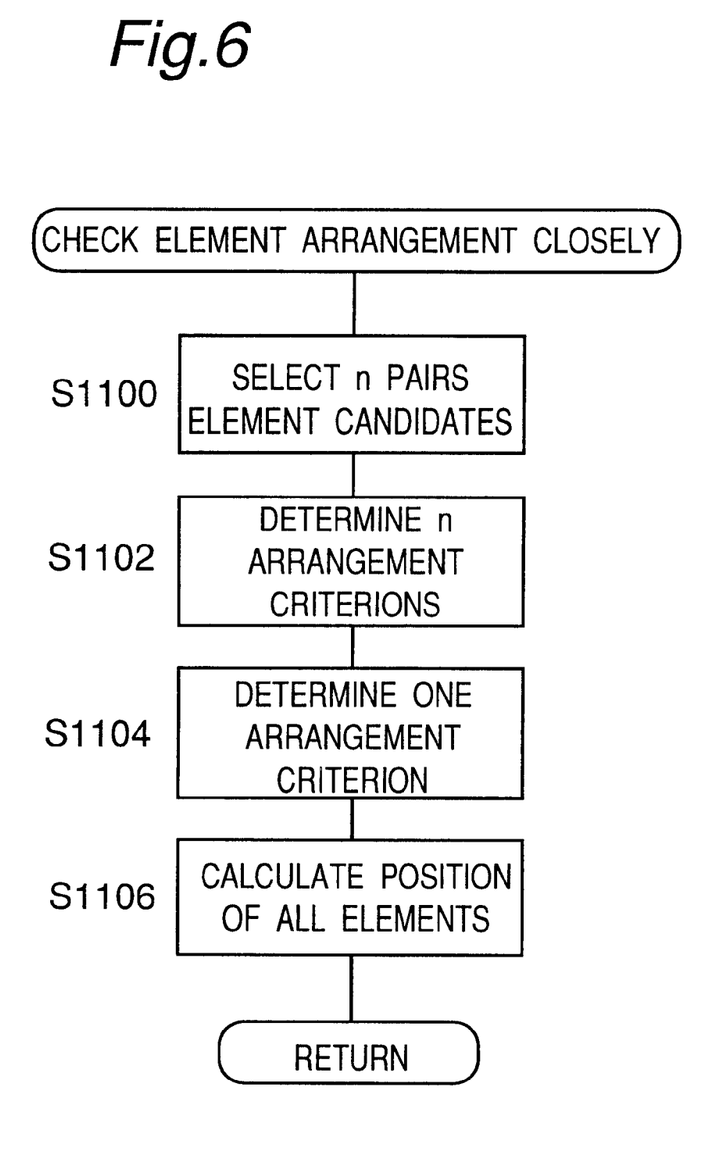
FIG. 6 is a flowchart of close check of the element arrangement.
Figure 7:
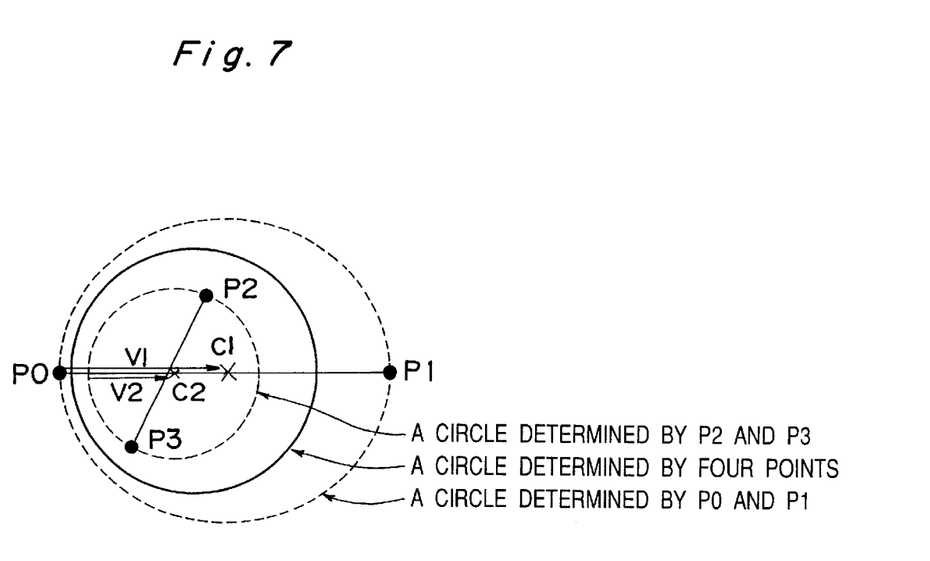
FIG. 7 is a diagram for illustrating determination of arrangement criterion.

FIG. 6 is a flowchart of the close check of element arrangement (S110). In the specified pattern consisting of five elements P0 to P4, if a vector from the center C of the circle to P0 is determined, all the positions of the elements P0 to P4 can be determined. Therefore, arrangement criterion consists of C and v. The arrangement criterion represents minimum information sufficient to calculate the positions of all the elements. In the close detection of element arrangement, the arrangement criterion is determined.

First, n pairs (n≧2) are selected among a plurality of element candidates detected above in the above-mentioned rough detection (S1100). Then, n arrangement criterions are obtained on the selected n pairs (S1102), and one arrangement criterion is obtained based on the n arrangement criterions (S1104). For example, the one arrangement criterion is calculated as an average of the n arrangement criterions. Then, the positions of all the element candidates are calculated from the obtained criterion (S1106). In an example shown in FIG. 5, two pairs, (P0 and P1) and (P2 and P3), are selected. The selected pairs include a pair of (P0 and P1) of element candidates having the largest distance. Then, the first criterion is calculated based on the positions of P0 and P1, and the second criterion is calculated based on the positions of P2 and P3. Because the first pair, P0 and P1, having the largest distance is arranged along a line passing through the center of the circle, as the first arrangement criterion, the center coordinate C1 of the circle and a vector v1 from P0 to the center of the circle are determined. If the coordinate of P0 is represented as (x0, y0) and that of P1 is represented as (x1, y1), the vector v1 and the center coordinate C1 are determined according to following relationships.

$$v1 = \frac{1}{2}\begin{pmatrix} x1 - x0 \\ y1 - y0 \end{pmatrix}, \quad (1)$$

and $$C1 = \frac{1}{2}\begin{pmatrix} x1 + x0 \\ y1 + y0 \end{pmatrix}. \quad (2)$$

Further, because the second pair (P2 and P3) is arranged at the predetermined positions in the circle, the second arrangement criterion is determined as the center coordinate C2 of the circle and a vector v2 from P0 to the center of the circle determined based on P2 and P3. If the coordinate of P2 is represented as (x2, y2) and that of P3 is represented as (x3, y3), the vector v2 and the center coordinate C2 are determined according to following relationships.

$$v2 = \frac{1}{2}\begin{pmatrix} \cos 120° & -\sin 120° \\ \sin 120° & \cos 120° \end{pmatrix}\begin{pmatrix} x3 - x2 \\ y3 - y2 \end{pmatrix}, \quad (3)$$

and $$C2 = \frac{1}{2}\begin{pmatrix} x2 + x3 \\ y2 + y3 \end{pmatrix}. \quad (4)$$

Next, zeroth arrangement criterion is calculated which represents an average circle of the two circles determined based on the above-mentioned two arrangement criterions. For example, a midpoint (C1+C2)/2 of the two coordinates C1 and C2 is set to the center coordinate C of the average circle, and an average (v1+v2)/2 of the two vectors is set to the vector from P0 to the center of the average circle. By using the zeroth arrangement criterion (C, v), the coordinates of P0 to P4 are determined as follows. (In the following relationships, a vector is represented with an arrow.)

$$P0 = C - \vec{v}, \quad (5)$$

$$P1 = C + \vec{v}, \quad (6)$$

$$P2 = C + \begin{pmatrix} \cos 60° & -\sin 60° \\ \sin 60° & \cos 60° \end{pmatrix}\vec{v}, \quad (7)$$

$$P3 = C + \begin{pmatrix} \cos 120° & -\sin 120° \\ \sin 120° & \cos 120° \end{pmatrix}\vec{v}, \quad (8)$$

and $$P4 = C + \sin 30°\begin{pmatrix} \cos 120° & -\sin 120° \\ \sin 120° & \cos 120° \end{pmatrix}\vec{v}. \quad (9)$$

In the image recognition explained above, even when an element candidate is shifted largely from the ideal position, the position is determined based on a plurality of arrangement criterion. Therefore, the effect of the shift is distributed to the positions of all the elements in the calculation. Thus, the positions near the true coordinate values can be obtained, and the search of pixels in the matching is necessary only around the true coordinate values. Then, the number of pixels to be accessed becomes smaller, and necessary resources for the image recognition become smaller, while the search can be performed at higher speed.

In the close detection of element arrangement, only the position data are stored as standard pattern. It is not necessary to store an image of specified pattern.

Even when the specified pattern to be detected in an image is rotated relative to the standard position, the detection is not affected much by the rotation. It is not needed to prepare a plurality of reference patterns shifted by a certain angle successively.

By including an element pair having the largest distance in the n element pairs, errors in the calculation of coordinate values of the other elements become minimum.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor which detects a specified pattern defined by arrangement of three or more elements comprising:
    a first detector which detects positions of a plurality of element candidates based on input image data;
    a selector which selects n pairs (n≧2) of element candidates in the plurality of element candidates detected by said first detector;
    a determinater unit which determines n arrangement criterions based on the positions of the n pairs selected by said selector and determines one arrangement criterion based on the n arrangement criterions;
    a calculater unit which calculates positions of all the elements in the specified pattern by using the one arrangement criterion determined by said determinater unit; and
    a second detector which detects the specified pattern based on the positions on the arrangement calculated by said calculater unit.

2. The image processor according to claim 1, wherein the n pairs include a pair having the largest distance between the element candidates in the pair.

3. The image processor according to claim 1, wherein the one arrangement criterion is determined as an average of the n arrangement criterions.

4. The image processor according to claim 1, wherein the one arrangement criterion includes center position of a selected element candidate pair.

5. The image processor according to claim 4, wherein the one arrangement criterion includes a vector from position of an element candidate to the center position.

6. The image processor according to claim 1, further comprising a binarization unit which binarizes input image data with respect to a predetermined color to provide bi-level image data, wherein said first detector detects the positions of the plurality of element candidates based on the bi-level image data.

7. A method of image processing for detecting a specified pattern defined by arrangement of three or more elements comprising the steps of:
    detecting positions of a plurality of element candidates based on input image data;
    selecting n pairs (n≧2) of element candidates in the plurality of detected element candidates;

determining n arrangement criterions based on the positions of the selected n pairs and determines one arrangement criterion based on the n arrangement criterions;

calculating positions of all the elements in the specified pattern by using the determined one arrangement criterion; and detecting the specified pattern based on the calculated positions on the arrangement.

8. The method according to claim 7, wherein the n pairs include a pair having the largest distance between the elements in the pair.

9. The method according to claim 7, wherein the one arrangement criterion is determined as an average of the n arrangement criterions.

10. The method according to claim 7, wherein the one arrangement criterion includes center position of a selected element candidate pair.

11. The method according to claim 10, wherein the one arrangement criterion includes a vector from position of an element candidate to the center position.

12. The method according to claim 7, further comprising the step of binarizing input image data with respect to a predetermined color to provide bi-level image data, wherein the positions of the plurality of element candidates are detected based on the bi-level image data.

13. A recording medium to be executed by a computer storing a program comprising the steps of:

detecting positions of a plurality of element candidates based on input image data;

selecting n pairs (n≧2) of element candidates in the plurality of detected element candidates;

determining n arrangement criterions based on the positions of the selected n pairs and determines one arrangement criterion based on the n arrangement criterions;

calculating positions of all the elements in the specified pattern by using the determined one arrangement criterion; and detecting the specified pattern based on the calculated positions on the arrangement.

14. The method according to claim 13, wherein the n pairs include a pair having the largest distance between the elements in the pair.

15. The method according to claim 13, wherein the one arrangement criterion is determined as an average of the n arrangement criterions.

16. The method according to claim 13, wherein the one arrangement criterion includes center position of a selected element candidate pair.

17. The method according to claim 16, wherein the one arrangement criterion includes a vector from position of an element candidate to the center position.

18. The method according to claim 13, further comprising the step of binarizing input image data with respect to a predetermined color to provide bi-level image data, wherein the positions of the plurality of element candidates are detected based on the bi-level image data.

* * * * *